Sept. 4, 1945.  F. W. NATION  2,384,128
PIPE CUTTING MACHINE
Filed Oct. 14, 1943  3 Sheets-Sheet 2
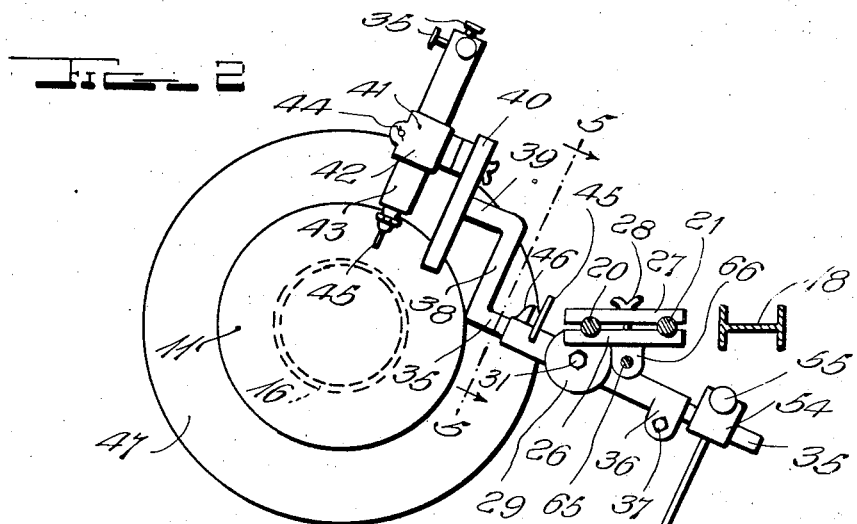

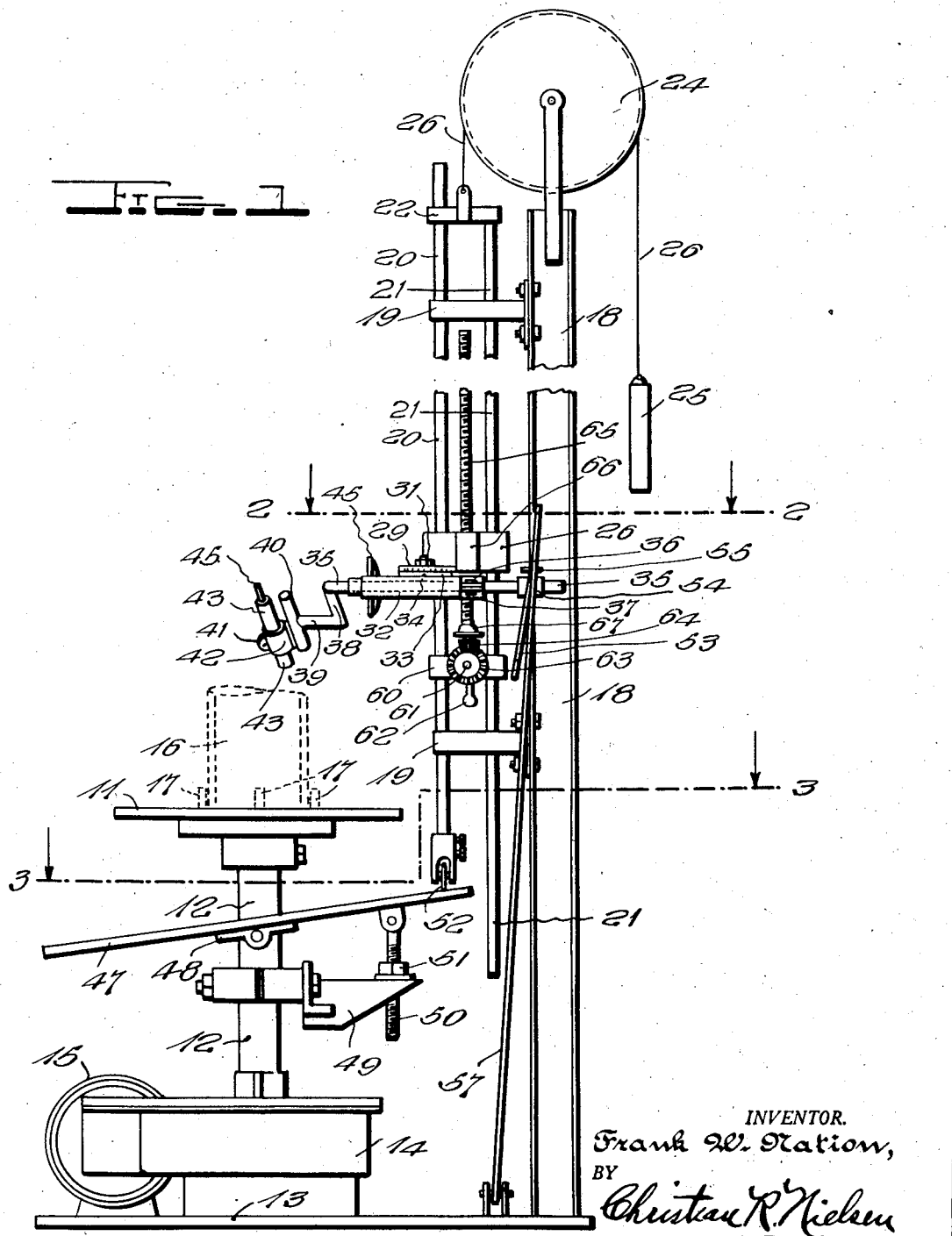

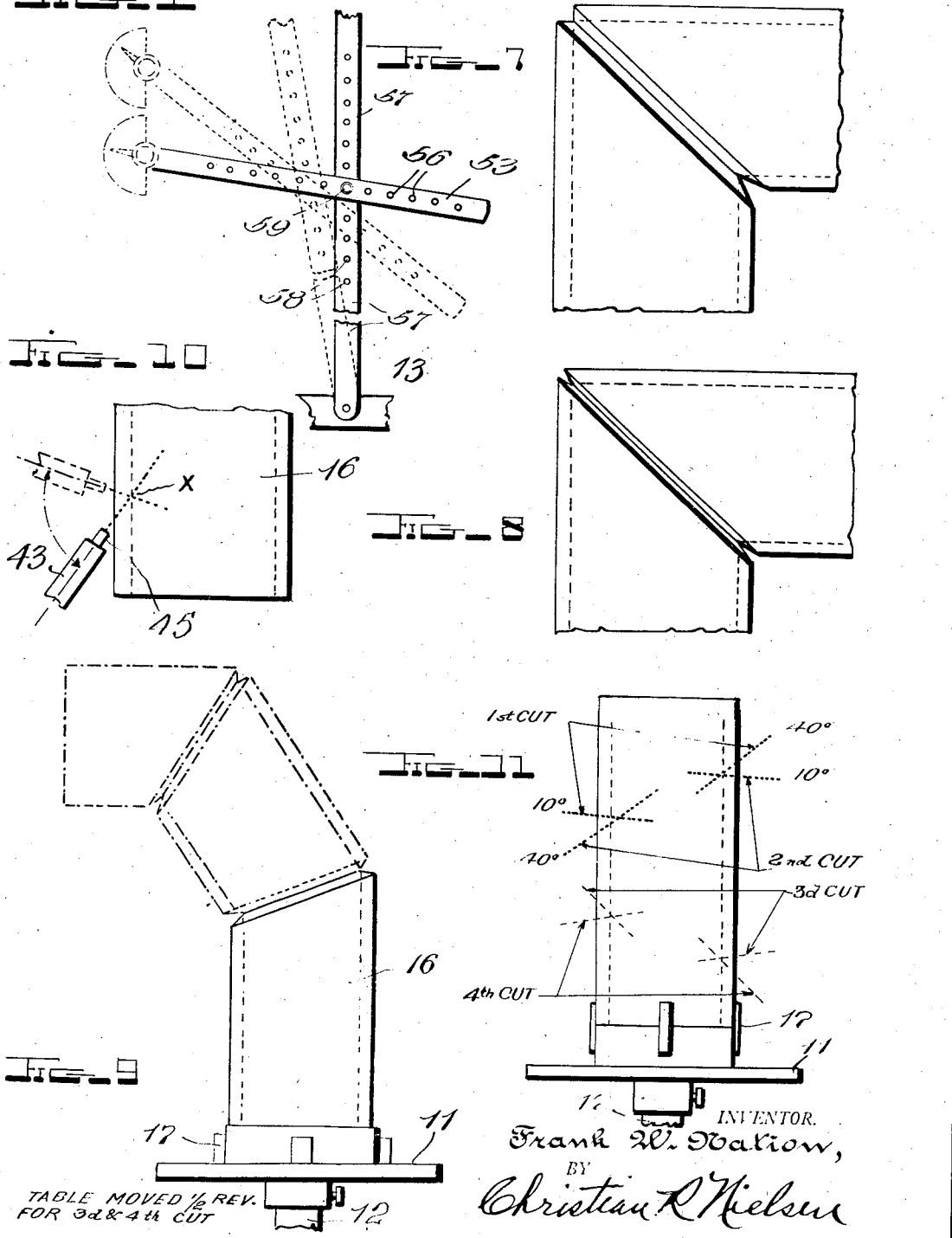

Patented Sept. 4, 1945

2,384,128

UNITED STATES PATENT OFFICE 2,384,128

PIPE-CUTTING MACHINE

Frank W. Nation, Fort Gibson, Okla.

Application October 14, 1943, Serial No. 506,249

4 Claims. (Cl. 266—23)

The invention has for an object to present an apparatus adapted for use in cutting pipe of various kinds by means of an acetylene torch or the like, on proper lines for assembly of joint sections to be united by welding, and especially for the formation of joints between pipe sections cut to a proper form in accordance with geometrical development of the proper plane within which the joints are to be made, and at the same time to effect a peculiar bevelling of the butted edge portions, to the end that a maximum efficiency in welding may be attained.

While the invention in its present embodiment is especially applicable to use upon pipe of circular cross section, the invention may be modified to adapt it to use for other materials, as will be understood from the following disclosure.

It is a practice in the construction of pipe systems, and also to a large extent in forming special pipe bends in large pipes, to build up the necessary bends by cutting sections from plain rectilinear pipe in planes adapting them to be butted end to end to form the completed bend. In some instances where a 90 degree angle is involved, and friction of flow through the pipe is an immaterial factor, the bend may be made by joining two pipe sections at right angles to each other. In other cases, however, it is found desirable to use three or more sections, so that a more or less rounded bend is formed. At the same time, in the formation of such bends it is desirable to bevel the butted edges, so that a V-groove is formed by the opposed edges thus butted. Contrary to the practice in joining pipe ends butted in common axial relation, instead of it being possible to form the bevel at a similar angle to longitudinal elements of the pipe all the way around its circumference, it is necessary to change the angle of bevel progressively from the outer side of the joint to the inner side, and the present practice is such as to nearly as possible have this bevel at such angle that when the two sections of the joint are butted together, the groove formed by the opposed cut edges will be of the same width throughout the circumference of the joint. It has been found possible to cut pipe with the desired bevel by the use of the oxyacetylene torch or other torch device of efficient function for the purposes, and it is a particular aim of my invention to provide an automatic machine in which a cutting torch or other cutters and the work are moved relatively in the necessary relation to produce cuts in the desired special plane and with the peculiar bevels necessary in various types of bends, as well as various sizes of pipe, and to permit the modification of the functioning of the device to suit special requirements where modification of standard procedure are involved, and for other purposes.

It is in consequence possible to utilize my invention in such manner that there will be a minimum expenditure of time and material involved in forming welds, so that unusually long gaps in the outermost part of the V-groove will be avoided, as well as too narrow a space or irregularities in the angles, so that a maximum strength of weld may be produced at the same time.

Incident to the accomplishment of the above ends, it is also an important aim of my invention to present an extremely simple construction in the apparatus necessary, and to enable this to be embodied in a form which will be liable in a minimum degree to derangement or damage incident to rough uses to be expected in pipe foundries, machine shops and other situations where the necessary work has to be performed with my machine.

A further aim of the invention is to present an apparatus which may be operated by workmen without highly specialized training in geometry and mathematics, but which can be readily understood and operated with high efficiency by ordinary workmen of moderate experience and knowledge of the use of cutting torches.

Another important aim of the invention is to provide a novel means for effecting the necessary movements of a torch and the work relatively, so as to simultaneously effect the movement of the torch circumferentially of the work, and also to modify the angle of the torch with relation to incident longitudinal elements of the work during the cutting operation.

One of the most important aims of the invention is to present a construction and apparatus which will be entirely automatic in attaining all of the functions necessary to the cutting of pipe in the peculiar forms required.

Another aim of the invention is to present an apparatus of this kind which may be quickly and accurately adjusted to vary the lengths of sections to be cut, as well as the plane and angle of cut. A further important aim of the invention is to present apparatus which may be quickly adjusted with great certainty to produce desired forms and angle of bevels.

Another object is to present an apparatus which may be quickly adjusted for different sizes and angles of the plane of cut as well as changes of bevel of cut, with a minimum of effort on the part of the operator.

Additional objects, advantages and features of invention reside in the construction, arrangement and combination of parts involved in the embodiment of the invention, as will be more readily understood from the following description and accompanying drawings, wherein, Figure 1 is a side elevation of an apparatus constructed in accordance with my invention, Figure 2 is a top view thereof, Figure 3 is a horizontal section on the line 3—3 of Figure 1, Figure 4 is a fragmentary elevation at right angles to Figure 1, showing the elements for adjustment of the automatic bevel control, Figure 5 is a fragmentary section on the line 5—5 of Figure 2, Figure 6 is an enlarged elevation of the crank shaft bearing, Figure 7 is a side elevation of a 90 degree pipe joint of moderate size, Figure 8 is a similar view of a joint with a similar angle, but appropriate for a larger side of pipe, or where a relatively small joint is desired, Figure 9 is a side elevation of the cut for a joint in which a plurality of pieces would be involved, one end section being shown in full lines, and the remainder of the joint being dotted, Figure 10 illustrates the range of movement of the cutting torch for such a joint, diagrammatically, Figure 11 is an elevational view of the piece of pipe showing how successive cuts are made upon the same piece of pipe to minimize the handling of work, particularly in chucking, and also to minimize waste of material.

There is illustrated a machine comprising a turn-table 11, consisting of a horizontal plate of suitable diameter to take the maximum diameter of pipe to be operated upon, and supported upon a vertical heavy rotating shaft 12, mounted in a base piece 13, which may include a reduction gearing case 14 in which a conventional form of reduction gearing may be incorporated, connected with the shaft 12 and driven by a motor 15, preferably of a variable speed type adapted to be controlled in conventional ways to vary the speed at which the turntable 11 is operated. The turntable is intended to support in a vertical position pieces of pipe to be cut, as dotted at 16, in Figure 1, and Figure 2. For holding the work upon the turntable any conventional chucking device may be employed, formally indicated at 17, and this may be of a suitable form of self-centering chuck, operable to engage work of various diameters.

Erected upon the base of the machine at a distance from the periphery of the turntable 11, sufficient to permit the working of a vertically reciprocable frame-work therebetween, there is a heavy post 18, of structural steel or the like, and projected forwardly from this post, there are upper and lower guide brackets 19, in which there are vertically reciprocable respective carriage rods 20 and 21. The brackets 19 are disposed in a plane with the post 18 and the axis of the turntable, so that the rods 20 and 21 are located in the same plane, one near the post 18, and the other disposed toward the turntable. The rod 20 has rigidly and permanently connected to its upper end, a cross head 22, in which the rod 21 is vertically slidable, and connected to this cross head there is a cable 26 extended upwardly and over a pulley 24 mounted at the upper end of the post, a counter-weight 25 being fixed at the extremity of the cable, to counter-balance the rods 20—21, and certain apparatus carried thereby, as will be described. The lower bracket 19 is preferably disposed closely adjacent the level of the turntable 11, or therebelow, so that cutting apparatus carried by the rods 20 and 21 and vertically adjustable therewith may be lowered to proper position to cut a joint of minimum length set upon the turntable.

The cutting apparatus in the present instance comprises a base block 26, set at one side of the rods 20 and 21, and grooved to receive the rods slidably therein, a clamp block 27 being disposed at the opposite sides of the rods in opposition to the block 26, and a binding screw 28 engaged through the last mentioned block and in the first one, so that the two may be clamped together upon the interposed rods 20 and 21, or released for vertical sliding movement upon the rods at times, as required in adjusting the device for cutting various lengths of pipe. Fixed upon the block 27, there is a horizontal pivot plate 29, located at the forward part of the block, the plate 29 being circular and formed with a thickened edge portion on which a dial 30 is marked, and secured to the under side of this plate by means of a coaxial bolt and nut at 31, there is a bearing sleeve 32 having an integral circular boss 33 at the upper side, which rests snugly against the under side of the plate 29, and is provided with a pointer mark 34 to indicate the relative position of the bearing sleeve with respect to the dial plate 29, the dial 30 being calibrated to indicate various sizes of pipe to which the device may be adjusted, as will be subsequently explained. Revoluble in the sleeve 32, there is a crank shaft 35 and at the rear end of the sleeve 32, the latter is split and provided with clamp ears 36 and a clamp bolt 37 by which the shaft may be secured at various positions in its rotative adjustments, as well as to permit slight longitudinal adjustments, if required.

The shaft 35 is provided at its forward end with a right angle crank arm 38, at the outer end of which a crank portion 39 is formed, parallel to the axis of the shaft and having at its end a cross bar 40, in a plane with the arm 38, and parallel to the latter. A clamp bracket 41 is slidably and removably engaged upon one end of the cross bar 40, so that it may be engaged similarly upon the other end, if desired, this bracket including outer clamp arms at 42, between which there is longitudinally slidable a cylindrical burner body 43, the clamp arms 42 being held in engagement therewith by means of an adjusting screw 44. The burner body 43 is thus held parallel to the cross bar 40 by the clamp arms 42, and in position substantially at right angles to the axis of the shaft 35. The burner body may have the usual passages therethrough for a combustible gas and a combustion supporting gas, leading to a conventional form of burner tip 45 adapted to project a needle-like flame longitudinally therefrom substantially on an axis which intersects the axis of the shaft 35. Conventional combustion regulating valves 46 are shown on the burner, and conventional connections for flexible conduits adapted to supply the necessary gases to the burner may be included in any approved forms.

Fixed upon the forward end of the sleeve 32, in a plane at right angles thereto, and at the left side of the sleeve, there is a semi-circular dial plate 45, concentric with the axis of the shaft 35 and fixed upon the shaft thereadjacent there is a pointer 46. Upon the plate 45 there is marked a dial calibrated in degrees from a central zero point, indicating a horizontal position of the burner 43, and the degree figures indicating the variations from horizontal of the burner upwardly or downwardly, according as the pointer 46 indicates.

A heavy cylindrical transverse pin is set diametrically in the shaft 12 a distance below the turntable 11, so as to project at opposite sides of the shaft, horizontally, and rockingly mounted upon the ends of this pin, there is an annular planiform cam plate 47 by means of a simple strap bearing 48 at the under side of the plate, as may be seen in Figure 1. Fixed upon the shaft 12 below the plate 47 a distance, there is a bracket arm 49, upon the outer end of which a tilting screw 50 is supported by means of a nut 51 resting upon the upper side of the bracket, the upper end of the screw being pivotally connected to the outer side of the cam plate 47, as shown, the bracket being suitably slotted at its outer end portion to permit the screw to pass therethrough and permit limited longitudinal movement of the screw therein, as may be required. The periphery of the cam plate lies adjacent the carriage rod 20, and beyond the rod 21, the lower end of which is provided with a wiper roller 52, in a conventional mounting, and resting upon the upper face of the cam plate 47 so as to support the rod 21, the connected mounting block 26, 27, and the rod 20, all of which comprise a carriage for the mounting of the burner tip, as may be understood. The roller 52 is arranged in a plane at right angles to an intersecting radius of the shaft 12, so that it will readily travel upon the plate 47 as the latter rotates.

It will be seen from the structure thus presented that by adjusting the plate 47 at a proper angle, and adjusting the shaft 35 by means of the clamp bolt 34 so that the axis of the shaft is approximately tangential to a piece of work upon the turn-table, and with the burner adjusted to direct the flame properly against the pipe, the pipe end will be cut in a plane corresponding to the inclination of the plate 47. The plane of the plate 47, however, is not necessarily parallel to the plane of the cut which will be made by the burner, the plane of the cut upon the work being more greatly inclined, and the inclination of the plane of the cut varying with a given setting of the plate 47, according to the diameter of the work, as will be appreciated.

In order to effect the setting and automatic operation of the tilting movement of the burner for varying the bevel of the cut, produced in the machine, I have provided upon the rear extremity of the shaft 35 an operating arm 53, having a split hub 54 thereof clamped upon the shaft by means of a clamp screw 55, as may be seen in Figures 1 and 2. The arm 53 is provided with a multiplicity of closely spaced longitudinally arranged apertures 56, as shown in Figure 4. Pivoted upon the base 13 closely adjacent the lower end of the post 18 there is an operating or anchor link 57 extended upwardly beside the arm 53, and having a multiplicity of longitudinally arranged apertures 58 therein, the link being connected to the arm 53 by means of an adjustable bolt or pivot pin 59 engaged through both the link and the arm, through suitable apertures 58 and 56. By this arrangement, as the carriage and burner are moved upwardly beside the plate 47, the link 57 will lower or raise the arm 53 and correspondingly rock the burner on its shaft 35. Customarily, work to be cut will have one end finished in a plane at right angles to the longitudinal axis of the work, so that it may be readily set up upon such end on the table 11, so as to stand in a vertical position. The length of the piece to be cut will be determined by the height of the burner, and in order to adjust the height of the burner with respect to the work generally, I have provided separately clamped upon the rods 20 and 21 an elevating screw device which moves as a part of the carriage unit. This apparatus comprises a base block 60, through which the rods 20 and 21 pass slidingly, and in which there may be fixed by suitable clamping screws or otherwise a crank shaft 61, being mounted horizontally in this block with a hand crank 62 by which it may be rotated and having at its inner end a bevelled gear 63, meshed with a small pinion 64 thereover, upon which is incorporated a vertical worm shaft 65 supported upon a suitable bracket arm 66 extended from the block 60. The shaft 65 is threadedly engaged in a lateral nut extension 67 formed on the right hand side of the base block 50 carrying the crank shaft. By having the block 60 secured upon the rods 20 and 21, and releasing the clamp screw 28 slightly, when the crank 62 is operated, the burner may be lowered and raised as desired. Ordinarily, the post 18 is made of considerable height, and the rods 20 and 21 extend from a short distance below the table 11 to a level with the top of the post 18, so as to afford a maximum range of adjustment of pipe lengths in the movement of the burner mounting block 26 vertically on the rods. After adjustment of the burner to the desired height by means of the crank 62, the clamping bolt 28 is again tightened to hold the burner mounting at this position upon the rods 20 and 21.

In use, the apparatus may be used for cutting pipes and other material in a horizontal plane, with or without bevel, according to the adjustment of the burner effected through the raising or lowering of the arm 53 and its securing in such raised or lowered position by attachment to the link 57, which may be termed an anchor link. To cut the work at right angles without a bevel, the burner is adjusted with the body portion on a horizontal axis, at which time the pointer 46 will indicate zero on the dial 45. The work being in place, and the burner tip being adjusted by rotation on the plate 29 so that it will be in practical proximity to the periphery of the work, and the plate 47 adjusted in horizontal position, the motor 15 is energized to rotate the work while the burner is in operation and the necessary cut will result. If desired for this horizontal cut to present bevelled edges on the work, the burner is given the necessary inclination by rotation of the shaft 35 through movement of the arm 53 and its attachment to the link 57. As long as the plate 47 is horizontal there will be no change in this angle of setting of the burner, as will be readily appreciated. In case the work is to be cut in a plane at an angle to the longitudinal axis of the work, however, preparatory to welding the work at the cut to another piece matched thereto, it is necessary to vary the bevel of the cut for welding, so that the angle of bevel with respect to the longitudinal axis of the work will be more acute at the low side of the cut, than at the high side. This variation in the angle of bevel in a given piece of work will vary between wide extremes where the cut is made in a plane at an angle of 45 degrees or more to the longitudinal axis of the work, and the range of variation within a given piece of work will diminish as the angle of the cut increases, until at 90 degrees, there need be no variation, as before indicated. The thickness of the wall of the pipe to be cut will also affect the range of variation in a given piece of work, there being less difference in the angle of opposite extremes in a thick walled pipe than would be required in a thin walled pipe. Thus, to provide for a joint at an angle of 45 degrees, the anchor link 57 would be connected to the arm 53 on a relatively short radius of the shaft 35. For a thick walled pipe, however, the link 57 would be connected to the arm 53 at a greater distance from the shaft 35, and also at a slightly lower point on the link 57, the setting of the cam plate 47 being the same in either case. The interior diameter of the pipe is the same.

In order that the inner edge of the cut may conform practically to the plane in which it is desired for the junction to be made, the axis of the shaft 35, theoretically, should coincide with the interior surface of the pipe being cut, but in ordinary work and due to the thickness of the projected flame and its tapering effect, it is found practicable to adjust the axis of the shaft 35 at a tangent to the work, as indicated in Figure 2.

In order to avoid errors on the part of workmen in judging angular setting of the shaft 35 and the burner tip with respect to the plane of cut to be made, it is convenient to have the dial 30 calibrated in sizes of pipe according to interior diameters, so that a workman knowing the size of the pipe which is to be cut may simply adjust the dial 30 with respect to the pointer mark on the boss 33 to the size of pipe indicated by the dial, as will be understood. Similarly, figures may be applied to the arm 53 adjacent the respective apertures to indicate standard sizes of pipe on which a standard bevel is produced.

It is an advantage of the invention that when a proper setting of the device for cutting a given size of pipe has been made, various lengths of pipe may be cut thereafter, without changing the setting of the device, except to adjust the connection at the arms 53 to a proper height on the anchor link 57.

In the adjustment of the device initially for making a cut, the proper setting of the bevel-varying connections may be determined by observing angles indicated on the dial plate 45 by the pointer 46 at one extreme of the cut to be made—that is, with the roller 52 either at the high or low side of the plate 47. Ordinarily, with this factor established, the setting of the device to secure the desired variation in the bevel at the opposite extremes of the cut will be understood, but this may also be checked after the setting of the connections is made by rotating the workholder and cam plate 47 to its opposite extreme, or through 180 degrees, and again in observing the angle indicated by the pointer 46.

A quick setting of the torch to the desired angle of bevel to be made without disturbing the connections between the operating arm 53 and anchor link 57 may be made by loosening the hand set screw 55 while the torch is manually moved until the desired angle is indicated by the pointer 46.

Requirement of calculations of the various settings to be made, or testing of the variations involved by various settings may be avoided by the provision of simple charts indicating the particular settings for various sizes and thickness of wall in pipes and the like, and the settings may be facilitated by the provision of scale and charts at the nut 51, or on the screw 50, and by the numbering of the apertures in the arm 53 and the link 57, these being matters of discretion and readily understood without detailed description or illustration.

While I have disclosed my invention with great particularity, in the best form of construction known to me, it will nevertheless be understood that this is purely exemplary, and that various modifications in the construction, arrangement and combination of parts, substitution of materials and substitution of mechanical equivalents and expedients otherwise, may be made without departing from the spirit of the invention, except as more particularly limited by the appended claims.

While a flame cutter as illustrated and described is the most economical and expeditious means for cutting pipe readily available at present for use with my machine, it is possible that other cutting means adapted to make a straight line cut through the work, or to cut in a plane, will be found available in place of the burner which I have shown, and it will be understood that such adaptation of other forms of cutters suitable for the work may be made without departing from the spirit of the invention.

It is possible to operate a rotary disc cutter in the path involved in my machine without likelihood of fracture of the disc by lateral pressure of the work thereon as the lateral faces of the disc will grind away enough material to compensate for the slight variation of the sides of the cut from a plane form, especially if a small disc is used.

Adaptation of a reciprocating saw cutter to use in place of the burner would be comparatively simple, requiring preferably a projected saw blade instead of a tensioned one, and means to reciprocate the blade not necessarily connected to the operating means for the work holder. It could consist of an independent unit including a motor drive, carried on the cross bar 49.

The rod 21 supported directly on the cam disc is made adjustable in the cross head 22 and secured by a set screw or other fastening 22' therein, in order to compensate for any slight correctional adjustment of the cam disc which may be necessary, or to compensate for wear of the wiper 52, or other reasons.

It will be apparent that the invention includes the advantage that, while including a pivotal mounting means for the cutter and operating means such that its angle of cut with respect to longitudinal elements of the pipe will be varied as required in the circumferential progress of the cutting operation, yet the inner edge portion of the work at the cut will still be accurately located at the exact plane in which the joint is plotted or planned. In consequence, when butted end to end the parts joined will extend at the true angle desired.

The invention also minimizes and simplifies the power transmission devices and connections required to attain all the essential functions of an automatic machine adapted to cut miter joints and bevel them properly for effective and economical welding.

I claim:

1. In a machine of the character described, a revoluble work holder, means to rotate the workholder, an annular planiform cam element pivoted on an axis transverse to that of the work holder and fixed with respect to the workholder, means to adjust and secure the cam in adjusted positions, two rods parallel to the axis of the workholder adjacent the cam laterally of the workholder, longitudinally spaced guide members receiving the extremities of the rods slidably, a wiper device in operating relation to at least one of the rods and engaged with a carriage body slidable on the rods between the guide members, means to secure it in adjusted positions on the rods including a separate member fixed on the rods, and a screw thereon engaged with said carriage body, and means to operate the screw; a bearing member mounted on the carriage body revoluble on an axis parallel to the rods, means to secure it in adjusted positions in rotation on said axis, a crank shaft revoluble in the bearing on an axis in a plane at right angles to the rods, said shaft having a crank extended outwardly from the axis of the work holder, a burner thereon directed inwardly on a line intersecting the axis of the shaft, an arm extended laterally from the shaft, and a pivotally mounted anchorage device engaged with the arm and adjustable longitudinally thereof.

2. A machine of the character described comprising a horizontal rotatable work holder, a burner mounting thereadjacent, a burner thereon directed toward the work, means to rotate the work-holder, means operatively connected with the work-holder and the burner mounting to move the burner vertically from one limit to another and back on each rotation of the work holder, and means to rock the burner on a horizontal axis transverse to the periphery of the work, comprising an anchor link having a pivot and lying in the general direction of the vertical movement of the burner mounting and a lateral arm on said mounting generally radial to said axis and an adjustable pivot connection between the anchor link and said arm.

3. In a machine of the character described, a vertical revoluble shaft, a work holder on the upper part thereof for holding pipe work concentrically with the axis of the shaft, an annular planiform cam pivotally mounted on the shaft below the work holder for oscillation on a horizontal axis, means to adjust and hold the cam in adjusted positions in its pivotal movement, a vertical guide means spaced laterally from the work holder, a burner carriage mounted thereon, a burner rockably mounted on the carriage on a horizontal axis tangent to the face of the work and rotatable also on a vertical axis spaced from the work holder, said burner mounting including an operating part spaced radially from said last named horizontal axis, a pivoted anchorage member fixed against vertical movement and connected to said operating part on the burner mounting and a wiper on the carriage in supporting engagement with said cam.

4. A mounting for burners of pipe cutting machines consisting of a vertical support, a carriage slidable thereon, a crank shaft having a bearing on the carriage mounted for rotation on an axis parallel to the path of the carriage, and being revoluble on the axis of the shaft, means to reciprocate the carriage slidingly, means to rotate work in synchrony therewith, said shaft having a crank portion, a burner mounted thereon with a flame projecting tip aligned with and short of said axis of the shaft, a lateral arm on the shaft and a pivotally mounted anchorage device pivotally connected with the arm.

FRANK W. NATION.